(12) United States Patent
Pajak et al.

(10) Patent No.: US 7,133,908 B1
(45) Date of Patent: Nov. 7, 2006

(54) METRICS AND STATUS PRESENTATION SYSTEM AND METHOD USING PERSISTENT TEMPLATE-DRIVEN WEB OBJECTS

(75) Inventors: Henry G. Pajak, Ontario, NY (US); Gavan L. Tredoux, Rochester, NY (US); Highland Mary Mountain, Phoenix, AZ (US)

(73) Assignee: Xerox Corporation, Stamford, CT (US)

( * ) Notice: Subject to any disclaimer, the term of this patent is extended or adjusted under 35 U.S.C. 154(b) by 900 days.

(21) Appl. No.: 09/718,477

(22) Filed: Nov. 24, 2000

(51) Int. Cl.
*G06F 15/173* (2006.01)

(52) U.S. Cl. .................. 709/223; 709/201; 709/217; 709/224; 709/236; 719/314; 719/315; 719/316

(58) Field of Classification Search ................ 709/223, 709/224, 236, 217, 201; 719/314, 315, 316
See application file for complete search history.

(56) References Cited

U.S. PATENT DOCUMENTS

| | | | |
|---|---|---|---|
| 5,708,816 A * | 1/1998 | Culbert .................. | 710/264 |
| 5,887,139 A | 3/1999 | Madison, Jr. et al. | |
| 5,974,237 A * | 10/1999 | Shurmer et al. ........... | 709/224 |
| 5,987,513 A * | 11/1999 | Prithviraj et al. .......... | 709/223 |
| 6,021,437 A * | 2/2000 | Chen et al. .............. | 709/224 |
| 6,070,190 A * | 5/2000 | Reps et al. .............. | 709/224 |
| 6,145,001 A | 11/2000 | Scholl et al. | |
| 6,195,650 B1 * | 2/2001 | Gaither et al. ............. | 707/1 |
| 6,356,933 B1 * | 3/2002 | Mitchell et al. ........... | 709/203 |
| 6,397,245 B1 * | 5/2002 | Johnson et al. ............ | 709/203 |
| 6,446,113 B1 * | 9/2002 | Ozzie et al. .............. | 709/204 |
| 6,529,932 B1 * | 3/2003 | Dadiomov et al. ......... | 718/101 |

FOREIGN PATENT DOCUMENTS

| | | |
|---|---|---|
| EP | 0 843 230 A2 | 5/1998 |
| EP | 0 923 270 A2 | 6/1999 |
| WO | WO 99/30423 | 6/1999 |

OTHER PUBLICATIONS

U.S. Appl. No. 09/522,082, filed Mar. 2000, Sampath et al.

* cited by examiner

*Primary Examiner*—Saleh Najjar
*Assistant Examiner*—Michael Y. Won
(74) *Attorney, Agent, or Firm*—Oliff & Berridge, PLC (57) ABSTRACT

A Web-based management system operating method automates collection and analysis of information from a plurality of networked devices, as well as creation of metrics, and independently assembles and displays data related to the networked device information on a distributed network. The networked devices may include one or more copiers, printers, facsimile machines and multifunction devices. Internal and external data is gathered from the networked devices. At least one of graphical, textual, statistical, metrics and status data is generated using a network database concurrently. This data is assembled and presented to a user on demand as one or more Web pages. The method uses template-driven mechanisms, or Web objects, that significantly simplify the creation, dynamic modification and persistence, as well as enforcement of concurrency, contention, and atomicity rules between, individual Web objects that compose the Web pages through the use of objects, concurrent state machines, events and actions within states. A Portion of the Web page can be separately created, e.g., manually or with a web page authoring tool The Web objects are combined and populated dynamically from the appropriate Web object states for the final display as a Web page by a Web browser.

24 Claims, 10 Drawing Sheets

METRICS AND STATUS PRESENTATION SYSTEM AND METHOD USING PERSISTENT TEMPLATE-DRIVEN WEB OBJECTS

BACKGROUND OF THE INVENTION

1. Field of Invention

This invention relates to automated data collection, monitoring, analysis and metrics of multiple devices on a network.

2. Description of Related Art

A wide variety of techniques are known for manipulating each of the individual technologies that exist in a Web-based concurrent system environment. For example, some techniques focus on the Web Client user interface. Other techniques focus on the simple network management protocol (SNMP) data that networked copiers, printers, facsimile machines and multifunction devices use to share their status and other data. Still other techniques focus on various methods of communicating over the Internet or between programs, and on data analysis and processing for metrics.

In a concurrent networked device environment, where the data, state and actions being performed by many devices change almost constantly and often simultaneously, an orderly set of rules, policies and mechanisms need to be in place to interpret data and ensure that status information is reported efficiently. Copiers may run out of one or more supplies, billing data may need to be reported, operational alerts may need to issued regarding needed device repairs, network device supplies may need ordering when they become low and an order automatically created, the status of a device may need to be refreshed, accurate statistical information may need to be generated, and/or appropriate metrics may need to be applied to help evaluate the data being used by many users and systems.

SUMMARY OF THE INVENTION

At the same time, the application technology, even though it may be Web-based, may need to span a variety of technologies where there is little uniformity in rules or mechanisms. For example, the technology and practice of using a database differs considerably from that of Web-page generation, real-time simple network management protocol data gathering, or the rules and practices of state machines. Therefore, the expertise needed to construct an application integrating such various technologies could be excessively demanding.

This invention provides systems and methods that overcome much of the complexity associated with the many technologies, disciplines and/or operational considerations in a Web-based concurrent system environment.

This invention separately provides systems and methods that tie together the various disparate technologies in a simpler and more coherent manner than can be realized by the individual technologies alone.

This invention separately provides systems and methods that utilize Web objects in a Web-based concurrent system environment.

This invention separately provides systems and methods that automatically creates one or more Web objects using state machine and event mechanisms. In various exemplary embodiments, the Web object state transitions are generated and transitioned in real-time. In various exemplary embodiments, the Web-page state transitions and actions within those state machines are executed independently of user interaction.

This invention separately provides systems and methods that improve the integrity of persistent Web objects to enable improved online and/or offline updating of data embedded in Web pages.

This invention separately provides systems and methods that allow many implementations in which one or more front-end Web servers or related systems manipulate a common persistent Web object while maintaining consistency and integrity of data in the common persistent Web object.

This invention separately provides systems and methods that allow load-balancing across front-end systems.

This invention separately provides systems and methods that allow simultaneous alternative views of a common Web object.

This invention separately provides systems and methods that allow each of a plurality of users that share reading and writing of data, whether human or automated, to access the Web objects without affecting the views and integrity of other users data.

This invention separately provides systems and methods that use Web objects consisting of template-driven mechanisms that significantly simplify creation, dynamic modification and/or persistence of individual Web objects that compose Web pages.

This invention separately provides systems and methods that use Web objects consisting of template-driven mechanisms that enable concurrency, contention and atomicity rules to be applied between individual Web objects that compose Web pages.

This invention separately provides systems and methods including Web-objects that use objects, state-machines, events and actions within states.

In various exemplary embodiments according to this invention, web-based concurrent systems and methods automate data collection, monitoring, analysis and/or metric creation independently of assembling and displaying status and data about enterprise networked copiers, printers, facsimile machines, multifunction devices and or any other known or later developed network-connectable device. Web pages displaying such status and data are assembled efficiently using Web objects.

In various exemplary embodiments, the systems and methods according to this invention gather and set internal and/or external status and device data from a multiplicity of networked devices, either asynchronously and/or synchronously, using a variety of technologies including simple network management protocol, extended markup language or web servers within, embedded into, or associated with, the devices. The device data may be stored in a network database.

In various exemplary embodiments, at the same time that the networked device data is gathered from the networked devices, the systems and methods according to this invention generate graphical, textual, statistical metric and/or status information using the networked device data from the underlying network database.

In various exemplary embodiments, at the same time this information is generated, the generated information is assembled and presented to a multiple users and/or assembled in a Web browser for on-demand display.

Various exemplary embodiments of the systems and methods according to this invention are based on recognition of problems in a real-time concurrent web-application, e.g., spanning numerous technologies, and resolving concurrency and contention issues between multiple users, and resolving concurrency of changing data, so that the data integrity is improved or preserved.

In various exemplary embodiments, the systems and methods according to this invention use Web objects that include explicit relationships between each of the Web-objects so that communication between the Web objects is accomplished using events and a fixed set of rules associated with the Web objects. These relationships and rule enforcement allow the systems and methods according to this invention to be created in a regular manner without needing to have to deal with lower level and more complex details, such as database locking. These built-in rules simplify the creation of applications.

In various exemplary embodiments of the systems and methods according to this invention, each of the template Web objects can be separately created, for example, manually or with a web page authoring tool The Web objects are combined and populated dynamically from the appropriate Web-object states for display as a Web page by the Web browser. In various exemplary embodiments, the presentation of a Web object is separated from its content by placing layout and appearance instructions in templates.

In various exemplary embodiments according to this invention, a framework is provided for developing Web applications. This framework is distinct from the Web applications themselves, which are created within and executed by the framework. The framework according to this invention should be contrasted with ad-hoc, informal methods for creating Web applications that have no formal framework or rules to constrain the behavior of the Web applications. Various exemplary embodiments according to the framework of this invention provide concurrent Web-based networked-device metric display, analysis and management.

By providing a formal approach, various exemplary embodiments of the systems and methods according to this invention enhance Web application behavior in important respects, for example, concurrent request management that avoids deadlock and race conditions. A Web application resulting from the formal approach according to various exemplary embodiments of the systems and methods of this invention is easier to understand and maintain. Further, in various exemplary embodiments of the systems and methods of this invention redesigning of Web applications is simplified and Web application behavior is more predictable.

These and other features and advantages of this invention are described in, or are apparent from, the following detailed description of various exemplary embodiments of the systems and methods according to this invention.

BRIEF DESCRIPTION OF THE DRAWINGS

Various embodiments of this invention will be described in detail, with reference to the following Figures, wherein.

DETAILED DESCRIPTION OF EXEMPLARY EMBODIMENTS

According to various exemplary embodiments of this invention, a framework is provided for developing Web applications. This framework provides a runtime or virtual machine for Web objects. According to various exemplary embodiments of this invention, Web objects are template-driven mechanisms that compose Web pages through the use of objects, concurrent state-machines, events and actions within states. The Web objects define explicit relationships between each of the concurrent state-machines, events and actions within states. The Web objects provide a persistent state-machine view of Web-application components.

Events enable messages and/or information to be sent to Web objects. Web objects can receive events from external sources, for example, Web browsers, or from other Web objects. In various exemplary embodiments, each Web object can include data and/or can specify a destination.

States of a Web object provide a history of past events, allowing the Web object to modify the response of that Web object to a new event based on the history of past events of that Web object. Thus, in various exemplary embodiments, the Web objects are able to receive and transmit events that can cause the Web objects to change state and perform actions associated with that state.

In various exemplary embodiments, actions defined within a Web object specify how the Web object will react to events that are received by the Web object. For example, events may cause the Web object to modify data contained within that Web object and/or within other Web objects. Alternatively, or additionally, events may cause that Web object to change state and/or generate an event. The generated event may be transmitted to an external entity, such as a Web browser, or to another Web object. For example, a Web object's actions within a state may gather read and write data from one or more external devices and then display that data on a Web browser, write to other Web objects, and/or write to the external devices.

In various exemplary embodiments of the systems and methods according to this invention, the Web-object systems include a mechanism for Web-object persistence. This persistence mechanism allows a Web object to maintain its state over time independently of any requests that the Web object receives. For example, the state of the Web object may be stored in a permanent storage mechanism, such as an underlying database.

According to various exemplary embodiments of this invention, the Web-object systems also include an event dispatcher as part of it's runtime software. The event dispatcher places events onto a queue and transmits each event in a predictable manner to the destination specified by that particular event. For example, as events are generated by external sources, such as HTTP requests from Web browsers, the events are placed into the event queue in the order the events are generated. The event dispatcher transmits each event from the event queue to the specified destination that receives the event and its data.

In According to various exemplary embodiments of the systems and methods according to this invention, the Web-object systems also include a locking mechanism. This locking mechanism ensures that Web objects correctly make the appropriate transitions between states, and that actions performed within a state are not interrupted. This reduces possible corruption of data and/or actions by other actions, events and/or Web objects. Thus, in various exemplary embodiments of the systems and methods according to this invention, the locking mechanism does not allow a Web object to be interrupted by other events while the Web object is changing states and/or performing actions. The Web object can process further events only after the Web object has changed its state and/or completed its actions. State changes of Web objects are thus atomic so that they cannot be interleaved or interrupted by other events and state changes in the same Web object or other Web objects and their data to which it is related, and must complete in their entirety. The Web-object runtime component of the systems and methods according to this invention manages the details required to ensure atomicity so that the Web objects need not separately implement atomicity.

In various exemplary embodiments of the systems and methods according to this invention, the Web-object systems also include a template creation system or device that provides one or more external representations of Web objects, such as, for example, a Web page coded in HTML. The external representation of a Web object may be persistent so that the representation does not need to be regenerated continuously. That is, rather than the entire external representation being regenerated, only those Web objects that require updating need to be regenerated.

In various exemplary embodiments of the systems and methods according to this invention, the Web-object systems allow the creation of larger, more complex concurrent communicating Web objects from individual Web objects, by combining the representations of the individual Web objects into larger representations.

The communication systems and methods associated with this invention are further described in copending U.S. patent application Ser. No. 09/718,493, filed herewith and incorporated herein by reference in its entirety.

Figure 1:
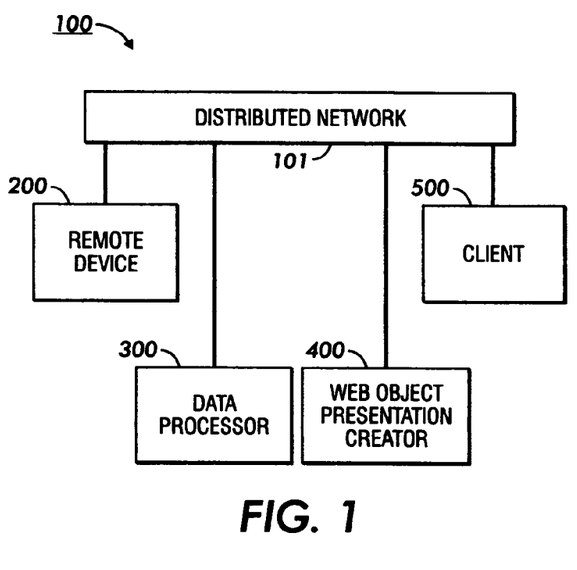
FIG. 1 is a functional block diagram illustrating a first exemplary embodiment of a metrics and status presentation system according to this invention.

FIG. 1 shows a functional block diagram of a first exemplary embodiment of a metric and status presentation system 100 according to this invention. As shown in FIG. 1, components of the metric and status presentation system 100 may communicate via a distributed network 101. The distributed network 101 may be, for example, an intranet, an extranet, a local area network, a metropolitan area network, a wide area network, a satellite communication network, an infrared communication network, the Internet, the World Wide Web, or any other known or later-developed distributed network.

The metric and status presentation system 100 includes at least one remote device 200. In various embodiments, the remote device 200 comprises one or more devices such as networked copiers, printers, facsimile machines, multifunction devices or any other known or later-developed network-connectable device. The metric and status presentation system 100 also includes a data processor 300, a Web-object presentation creator 400, and at least one Web client 500. In various embodiments of this invention, metrics and/or status data about the remote device 200 are gathered and processed by the data processor 300 and then transmitted to the Web-object presentation creator 400. The Web-object presentation creator 400 accesses and/or creates a presentation, for example, a Web page, from data processed by the data processor 300 and/or contained in templates. The presentation is created as requested by the Web client 500.

Figure 2:
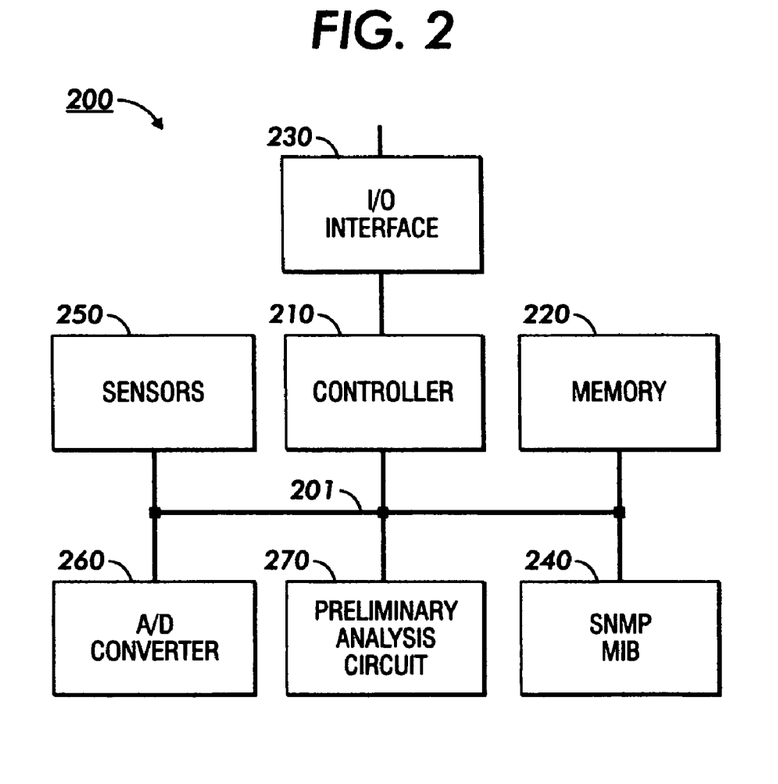
FIG. 2 is a functional block diagram illustrating an exemplary remote device for which metrics and status data are presented by the system of FIG. 1.

FIG. 2 illustrates an exemplary embodiment of the remote device 200 shown in FIG. 1. As shown in FIG. 2, the remote device 200 includes a controller 210, a memory 220, an input/output interface 230 and a simple network management protocol management information base (SNMP MIB) 240. In the exemplary embodiment shown in FIG. 2, the remote device 200 may also include one or more sensors 250, an analog-to-digital converter 260 and/or a preliminary analysis circuit or routine 270. The elements of the remote device 200 may be interconnected by a link 201. The link 201 can be one or more wired or wireless links or any other known or later-developed element or elements that are capable of supplying electronic data to and from the connected elements 210–270.

The input/output interface 230 may be any known or later-developed mechanism, such as a server or a client, that is capable of posting data from the remote device 200 over the distributed network 101 and receiving data from remote devices connected to the distributed network 101. Similarly, the sensors 250 may be any known or later-developed mechanism or mechanisms that are capable of detecting data pertaining to the remote device 200.

In operation, data pertaining to the remote device 200, such as metrics and status data, is collected by the controller 210 from one or more of the memory 220, the one or more sensors 250, and/or any other data sources providing the types of data described above and derived from the operational characteristics of the remote device 200. The data is processed by the controller 210 into a format recognizable by the preliminary analysis circuit or routine 270 and forwarded to the preliminary analysis circuit or routine 270. For example, the controller 210 may process the collected data by discretely sampling the analog data received from the one or more sensors 250 into qualitative values or by digitizing such analog data using the analog-to-digital converter 260. Alternatively, the controller 210 may process the collected data by translating device signals into discrete event sequences, as described in U.S. application Ser. No. 09/522,082, incorporated herein by reference in its entirety, that can be recognized by the preliminary analysis circuit or routine 270.

Figure 3:
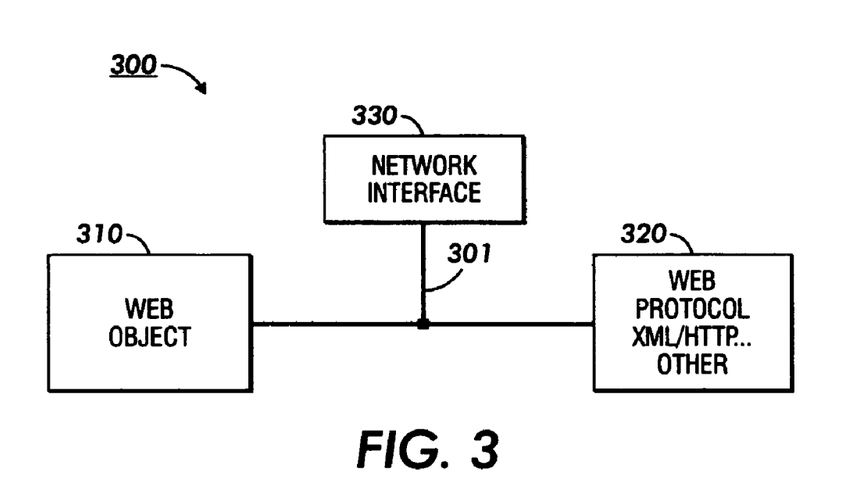
FIG. 3 is a functional block diagram illustrating an exemplary data processor of the system of FIG. 1.

While some data processing may be accomplished by the remote device 200, the data is further processed by the data processor 300 of the metric and status presentation system 100. FIG. 3 illustrates an exemplary embodiment of the data processor 300 shown in FIG. 1. As shown in FIG. 3, in various exemplary embodiments, the data processor 300 includes one-or more Web objects 310 that collect data from the remote device 200. The Web objects 310 collect the data using a standard network management or Web-protocol 320, such as SNMP, HTML over HTTP, or extended mark-up language (XML) over HTTP, from the distributed network 101. The data processor 300 also includes a network input/output interface 330 usable to receive and/or send data over the distributed network 101. The elements of the data processor 300 may be interconnected by a link 301. The link 301 can be one or more wired or wireless links or any other known or later-developed element or elements that are capable of supplying electronic data to and from the connected elements 310–330.

The network input/output interface 330 may be any known or later-developed mechanism, such as a server or a client, that is capable of accessing data about the remote device 200 posted over the distributed network 101 and/or sending data over the distributed network 101. The operation of the Web objects 310 is explained in more detail below.

Figure 4:
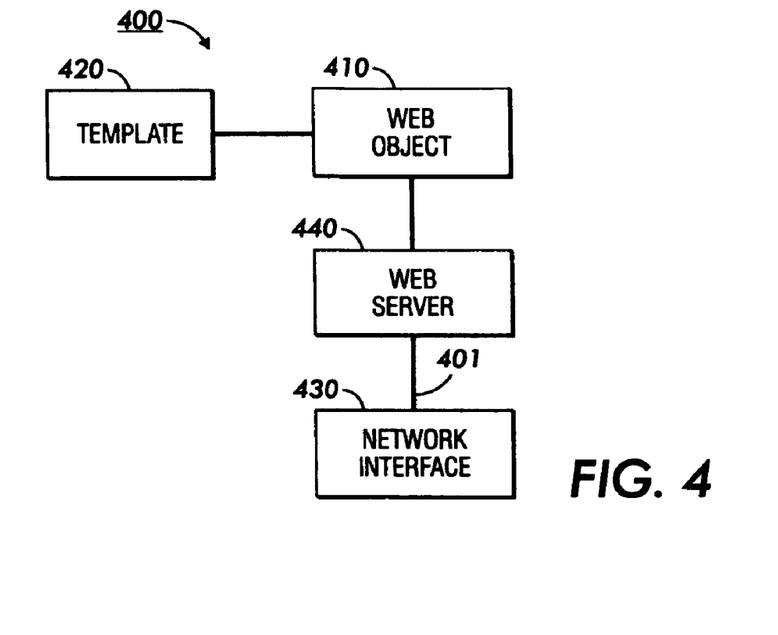
FIG. 4 is a functional block diagram illustrating an exemplary Web-object presentation creator of the system of FIG. 1.

FIG. 4 illustrates an exemplary embodiment of the Web-object presentation creator 400 shown in FIG. 1. As shown in FIG. 4, in various exemplary embodiments, the Web-object presentation creator 400 includes, or at least accesses, one or more Web objects 410 to be presented. The Web-object presentation creator 400 includes one or more templates 420 that can be populated by one or more of the Web objects 410. The templates 420 may be used by a Web server 440 to create a presentation of one or more of the Web objects 410, such as a Web page, that can be sent over the distributed network 101. The Web-object presentation creator 400 includes a network input/output interface 430 usable to receive and/or send data over the distributed network 101. The elements of the Web-object presentation creator 400 may be interconnected by a link 401. The link 401 can be one or more wired or wireless links or any other known or later-developed element or elements that are capable of supplying electronic data to and from the connected elements 410–440. The network input/output interface 430 may be any known or later-developed mechanism, such as a server or a client, that is capable of accessing the data about the Web objects 410, or the Web objects 410 themselves, and sending the presentation over the distributed network 101. The operation of the Web-object presentation creator 400 is explained in more detail below.

It should be understood that the Web objects 410 shown in FIG. 4 can be the same elements as the Web-objects 310 shown in FIG. 3. Thus, while the data processor 300 and the Web-object presentation creator 400 are shown separately, it should be understood that the data processor 300 and the Web-object presentation creator 400 may be embodied in the same device and/or software. The distinction between the data processor 300 and the Web-object presentation creator 400 is for the sake of description only and is not limiting.

Figure 5:
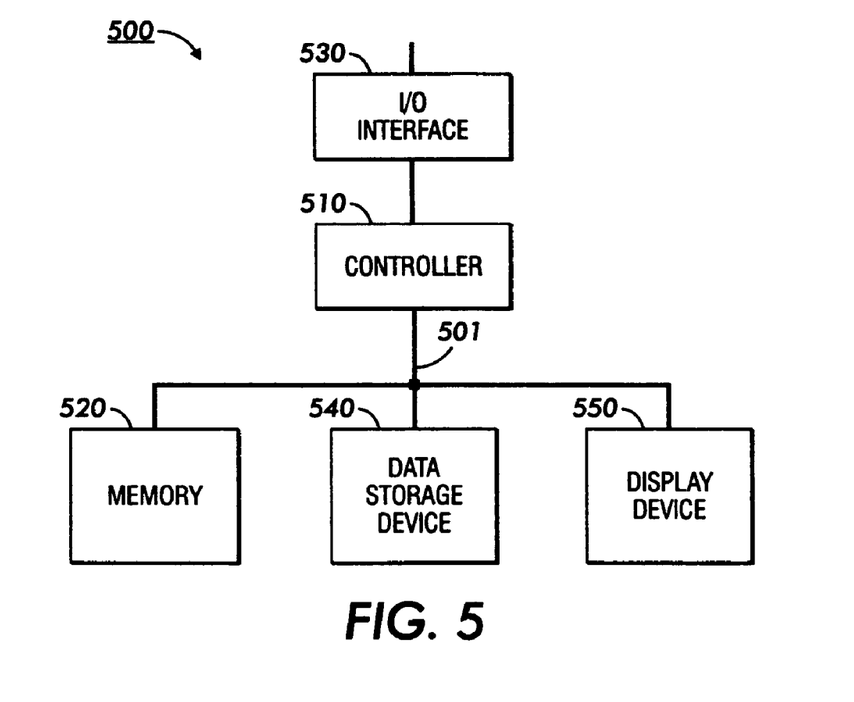
FIG. 5 is a functional block diagram illustrating an exemplary Web client of the system of FIG. 1.

FIG. 5 illustrates an exemplary embodiment of the Web client 500 shown in FIG. 1. As shown in FIG. 5, in various exemplary embodiments, the Web-client 500 includes a controller 510, a memory 520, an input/output interface 530, a data storage device 540 and a display device 550. The elements of the Web-client 500 may be interconnected by a link 501. The link 501 can be one or more wired or wireless links or any other known or later-developed element or elements that are capable of supplying electronic data to and from the connected elements 510–550.

The input/output interface 530 may be any known or later-developed mechanism, such as a server or a client, that is at least capable of receiving data from the distributed network 101.

In operation, the memory 520 may contain a Web browser application executed by the controller 510. A request from the Web browser is sent over the distributed network 101 by the input/output interface 530. The request causes the presentation of one or more of the Web objects 310 and/or 410 and/or the templates 420 to be provided to the Web client 500. The Web objects 310 and/or 410 and/or the templates 420 may be displayed to a user on the display device 550. The Web objects 310 and/or 410 and/or the templates 420 may also be stored by the data storage device 540 and displayed later. The controller 510 may also generate periodic requests to update the retrieved Web objects 310 and/or 410 and/or the templates 420. Thus, current data pertaining to the remote device 200, such as metrics and status data, may be displayed to the user on request as the presentation of one or more of the Web objects 310 and/or 410 and/or the templates 420.

Figure 6:
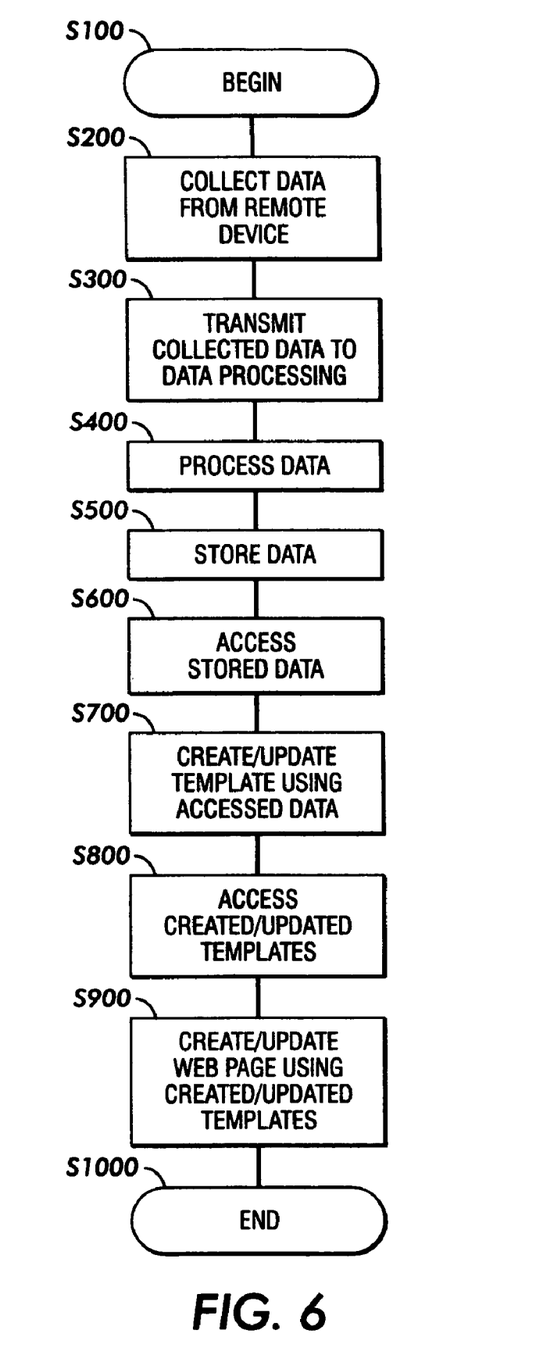
FIG. 6 is a flowchart outlining an exemplary embodiment of a method for presenting metrics and status information according to this invention.

FIG. 6 is a flowchart outlining an exemplary embodiment of a method for presenting metrics and status data according to this invention. Beginning in step S100, control continues to step S200, where data, such as metrics and status data, is collected from one or more remote devices. The remote devices may be networked devices and the data may be retrieved using a standard network management protocol, or a proprietary, device-specific, manufacturer-specified protocol. In various embodiments of this invention, the data is polled on a regular or irregular interval from the remote devices. Alternatively, or additionally, the data may be polled on demand. Next, in step S300, the collected data is transmitted to one or more persistent Web objects. Control then continues to step S400.

In step S400, the transmitted data is processed. As discussed below, in various embodiments, the data is processed by the one or more Web-objects. For example, activities such as determining running totals, updating graphs, altering existing spreadsheets and the like may be involved. Then, in step S500, the processed data is stored, for example, in one or more of the Web objects for later retrieval. Next, in step S600, the stored data is accessed. The data may be accessed automatically or may be accessed upon request, for example, a request by a Web client that presents metrics and/or status data. Control then continues to step S700.

In step S700, one or more templates are created and/or updated using the accessed data. In various embodiments of this invention, the templates are populated by one or more of the Web objects and thus form a representation of the Web objects. The created and/or updated templates may be stored for later presentation. Next, in step S800, the created and/or updated templates are accessed. For example, the templates may be accessed by a Web server. Then, in step S900, one or more Web pages are created and/or updated using the templates. In various embodiments of this invention, the template-based representations are combined with other template-based representations. The created and/or updated Web pages define a presentation of the data from the remote device, such as metrics and status data, and are available for viewing by one or more Web clients, for example, over a distributed network. Control then continues to step S1000, where the process ends. While these processing steps are shown executing serially, the procedures may actually execute concurrently in parallel in each of elements in 100, 200, 300, 400 and 500. As shown in FIGS. 7–10, the integrity of the data is maintained throughout the process.

Figure 7:
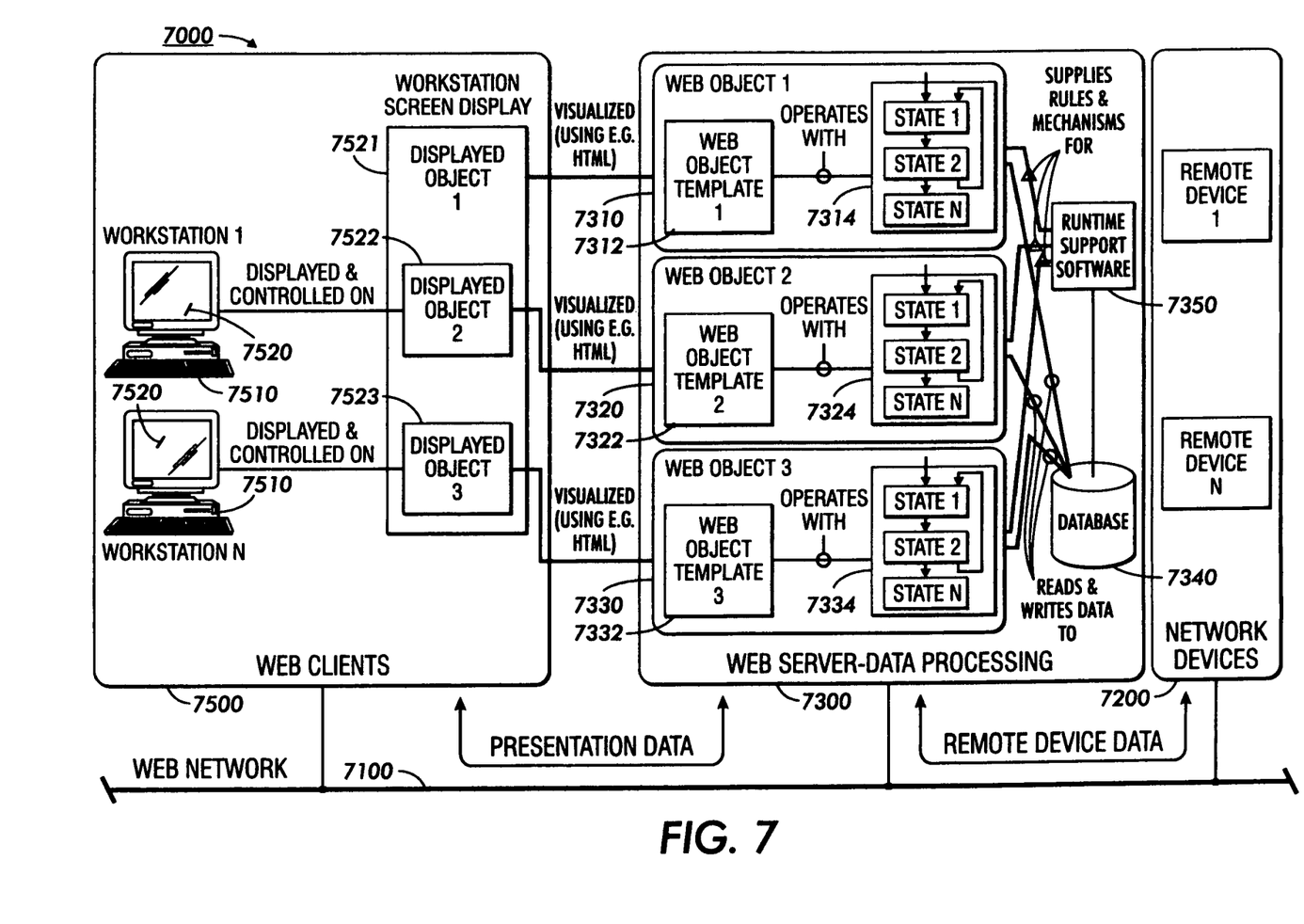
FIG. 7 is a functional block diagram illustrating an exemplary Web and network environment of Web objects according to this invention, including multiple devices, Web clients and Web-object templates with their own state machines, events and embedded Web objects.

FIG. 7 is a functional block diagram illustrating an exemplary Web and network environment 7000 of Web objects according to this invention, including multiple networked devices 7200, a data processor/Web-object presentation creator 7300 and multiple Web clients 7500, all interconnected by a network 7100, such as the Internet. The data processor/Web-object presentation creator 7300 includes multiple Web objects 7310, 7320 and 7330. Each Web object 7310, 7320 and 7330 has its own templates 7312, 7322 and 7332, and state machines 7314, 7324 and 7334, respectively. The data processor/Web-object presentation creator 7300 also includes a database 7340, or other data storage device, and one or more runtime support circuits, routines or managers 7350. The data processor/Web-object presentation creator 7300 may be embodied as any suitable computer-based device, such as, for example, a Web server.

The Web clients 7500 may be embodied as any device that is capable of receiving information from the network 7100 and displaying the information to a user. For example, the Web clients 7500 may be workstations 7510, such as personal computers, that each include a monitor or screen display 7520. It should be understood, however, that the Web-clients 7500 may be other devices, such as a hand-held personal digital assistant (PDA), a cellular or digital mobile telephone or an embedded web browser in a consumer appliance, such as a CD player, DVD player, or microwave oven.

In operation, one or more of the Web clients 7500 generate and transmit a request for information over the network 7100. For example, the workstations 7510 may access hyperlinks displayed in a web browser. The request is received by the data processor/Web-object presentation creator 7300 and processed by one or more of the Web-objects 7310, 7320 and/or 7330 using the state machines 7314, 7324 and/or 7334, respectively. State data for the state machines 7314, 7324 and 7334 is read from and stored in the database 7340. Rules and mechanisms for operation of the Web objects 7310, 7320 and/or 7330 and their state machines 7314, 7324 and/or 7334 are provided by the runtime support circuits, routines or managers 7350.

Data from the networked devices 7200 is transmitted to the data processor/Web-object presentation creator 7300, either automatically or as requested by the data processor/Web-object presentation creator 7300, and stored in the database 7340 for use by the Web objects 7310, 7320 and/or 7330 in their state machines 7314, 7324 and/or 7334. The Web objects 7310, 7320 and/or 7330 create and populate the templates 7312, 7322 and/or 7332 with data from the state machines 7314, 7324 and 7334 and/or the database 7340. The templates 7312, 7322 and/or 7332 are then transmitted in a proper format, such as HTML, XML, XHTML, PDF, or any other appropriate known or later-developed format, to the Web clients 7500, either individually or combined, to form a desired presentation of the requested information. For example, the requested information may be presented on the screen display(s) 7520 as a Web page formed by representations of the Web objects 7310, 7320 and/or 7330 or displayed objects 7521, 7522 and/or 7523.

Figure 8:
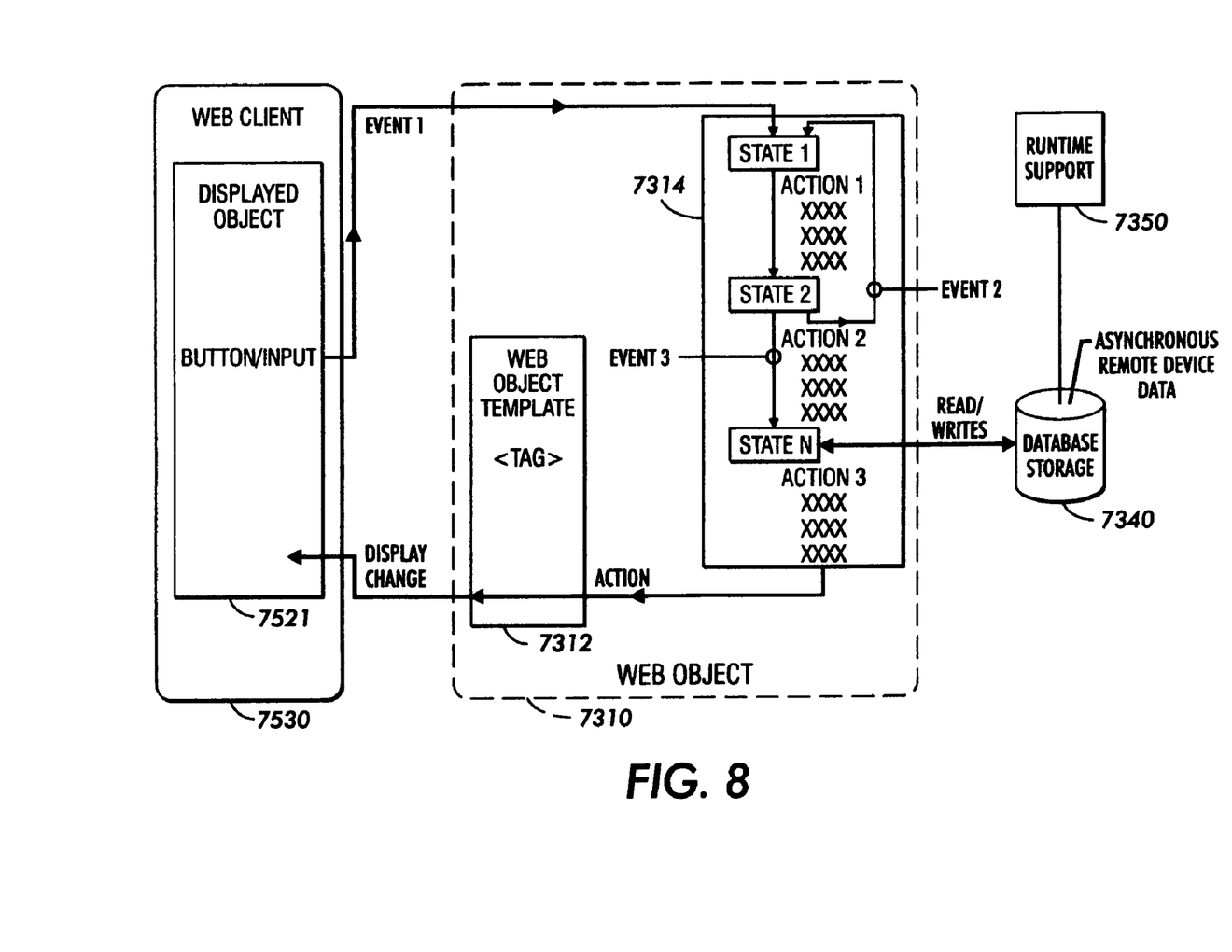
FIG. 8 is a functional block diagram illustrating a single Web object and a single Web client according to the Web and network environment of FIG. 7.

FIG. 8 is a functional block diagram illustrating a single Web object 7310 and a single Web client 7530 according to the Web and network environment 7000 shown in FIG. 7. The request for information by the Web client 7530 is transmitted to the Web object 7310 over the network 7100 and received as an Event 1. The Web object 7310 is in a State 1, a definite state, when the Event 1 is received. This definite state reflects the past history of the Web object 7310. The state machine 7314 is shown in abstract form as an event/state diagram to illustrate the reaction of the Web object 7310 to events based on the past history of events.

When the Web object 7310 receives the Event 1, the state machine 7314 produces one or more actions within that state, such as an Action 1. For example, the Action 1 may be receiving and manipulating remote device data for display, storing data in a database, or sending email to a device event subscriber. After the Web object 7310 completes the Action 1, the Web object 7310 changes state from the State 1 to a State 2.

The runtime support circuit, routine or manager 7350 ensures that the Web object 7310 processes the Event 1 atomically so that the processing cannot be interrupted. In other words, the Web object 7310 is not allowed to process another event until the Event 1 is processed and the Web object 7310 changes from the State 1 to the State 2.

In the State 2, the state machine 7314 may produce one or more actions, such as an Action 2, and/or an Event 2. When the Web object 7310 completes the Action 2, the Web object 7310 changes from the State 2 to a State 3. Depending on the past history of the Web object 7310, various events are created and processed and various actions are executed. The runtime support circuit, routine or manager 7350 manages the processing by creating an event queue that operates on a first-in-first-out basis. The event queue may be managed by an event dispatcher, which transmits events from the queue to specified destinations in the order in which they are received, providing a guaranteed event delivery system, so that Web objects do not have to implement or reinvent this functionality. Using the state machine 7314, the Web object 7310 updates itself atomically so that the remote device data displayed as the displayed object 7521 to the Web client 7530 is current.

Figure 9:
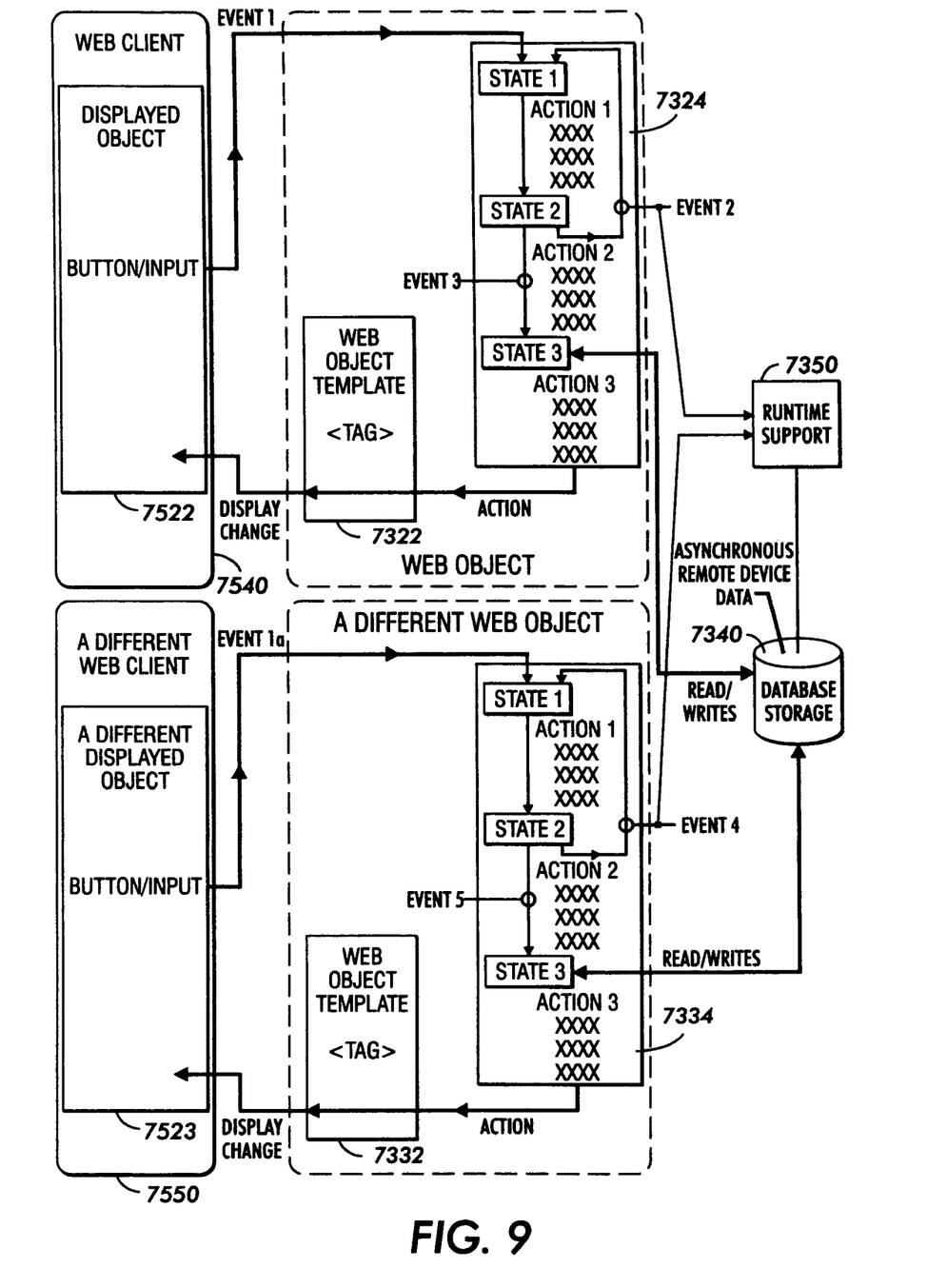
FIG. 9 is a functional block diagram illustrating multiple Web objects and multiple Web clients according to the Web and network environment of FIG. 7.

FIG. 9 is a functional block diagram illustrating multiple Web objects 7324 and 7334 and multiple Web clients 7540 and 7550 according to the Web and network environment 7000 shown in FIG. 7. The operation of the Web-object system shown in FIG. 9 is identical to the operation of the Web-object system described above with respect to FIG. 8, except that events and/or actions of the Web object 7324 are used to update the Web object 7334, and vice versa. The runtime support circuit, routine or manager 7350 manages the processing of events by the Web objects 7324 and 7334 so that contention and race conditions are avoided when one Web-object's state machine reads or writes the data in another Web object.

Also, the displayed object 7522 generated by the Web client 7540 may be different than the displayed object 7523 generated by the Web client 7550. For example, the information requested by each of the Web clients 7540 and 7550 may be different. Further, the displayed objects 7522 and 7523 may be different in appearance and content because the templates 7322 and 7332, respectively populated by the Web objects 7324 and 7334, may be different.

Figure 10:
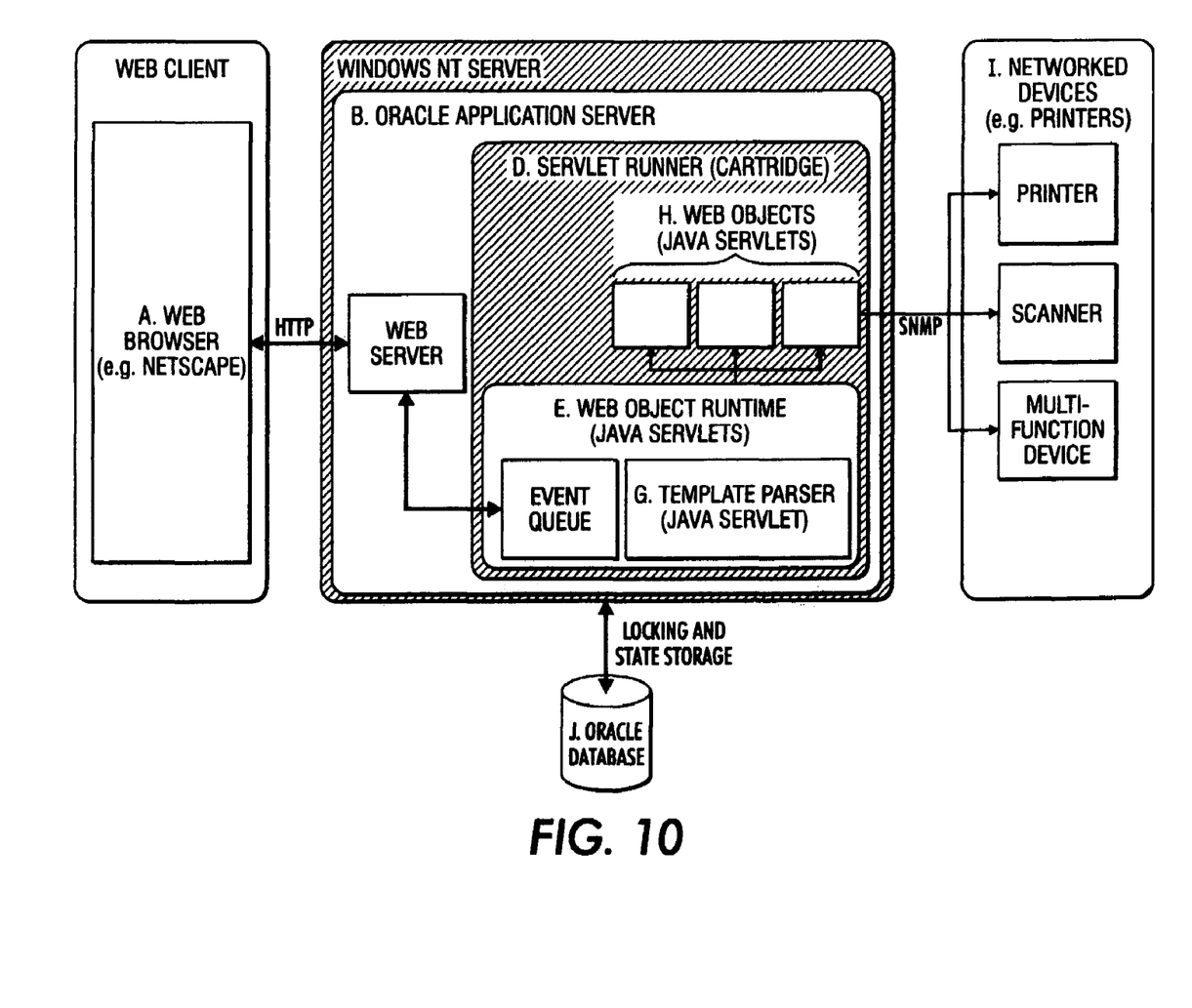
FIG. 10 is a functional block diagram illustrating an exemplary implementation of a metrics and status presentation system according to this invention.

FIG. 10 is a functional block diagram illustrating an exemplary implementation of a metrics and status presentation system according to this invention. The implementation runs on the Microsoft NT server operating system, under the Oracle Application server environment B which provides Web service facilities to the application. The Web object runtime E is implemented using Java Servlets as supported by the Java servlet cartridge D supplied by Oracle, and an Oracle database J. The runtime is used to execute Web objects implemented as additional Java servlets H. The Web objects communicate with networked printing devices I and poll data from these devices. The Web objects use a template parser G to form representations of themselves for display in a Web browser A, using the Web server B for communication with the Web browser A.

Figure 11:
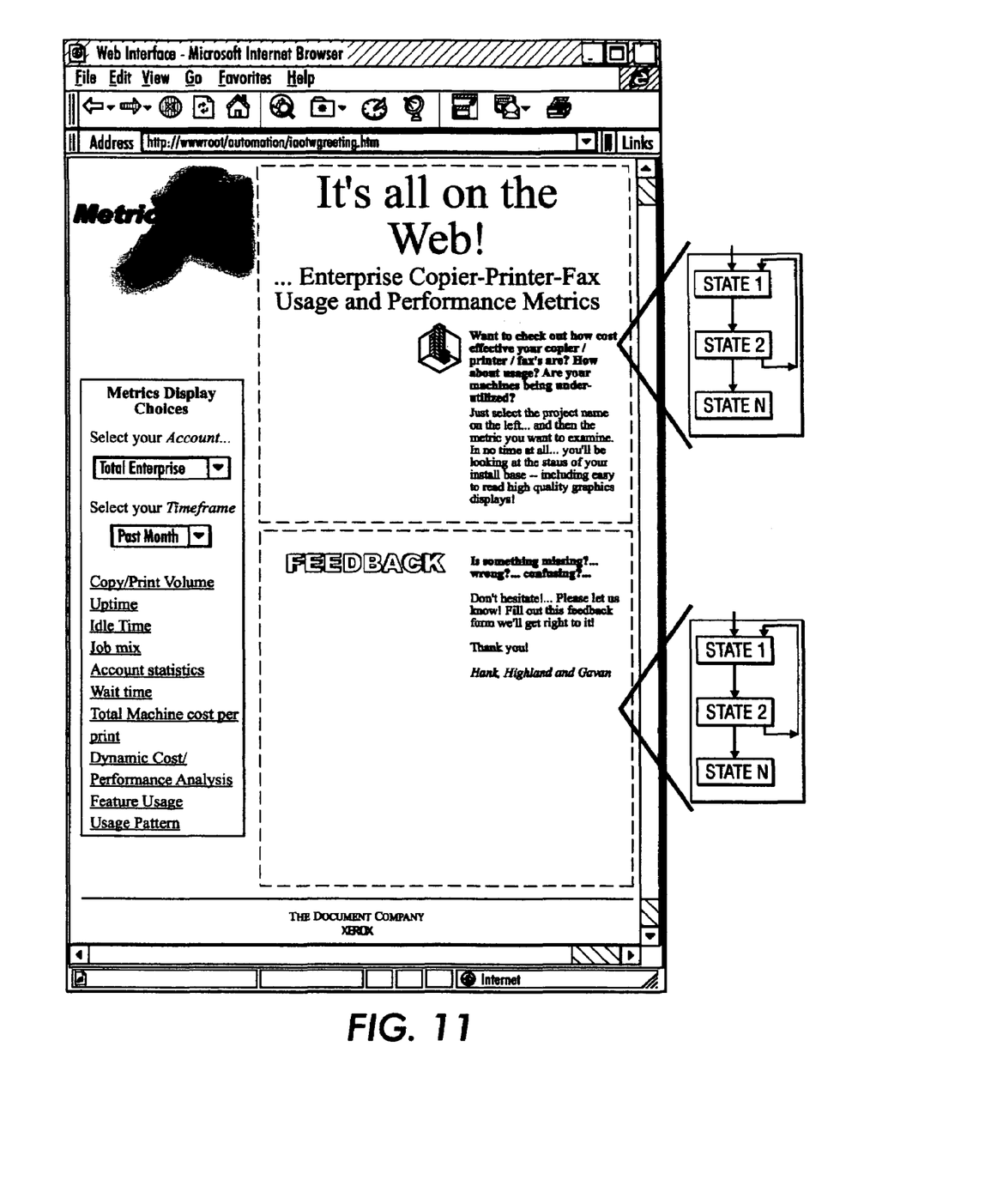
FIG. 11 shows a first exemplary embodiment of a Web-page presentation of a Web object containing a backing state machine and populated with simple HTML text.

FIG. 11 shows an exemplary Web-page presentation of a Web-object containing a backing state machine and populated with simple HTML text.

Figure 12:
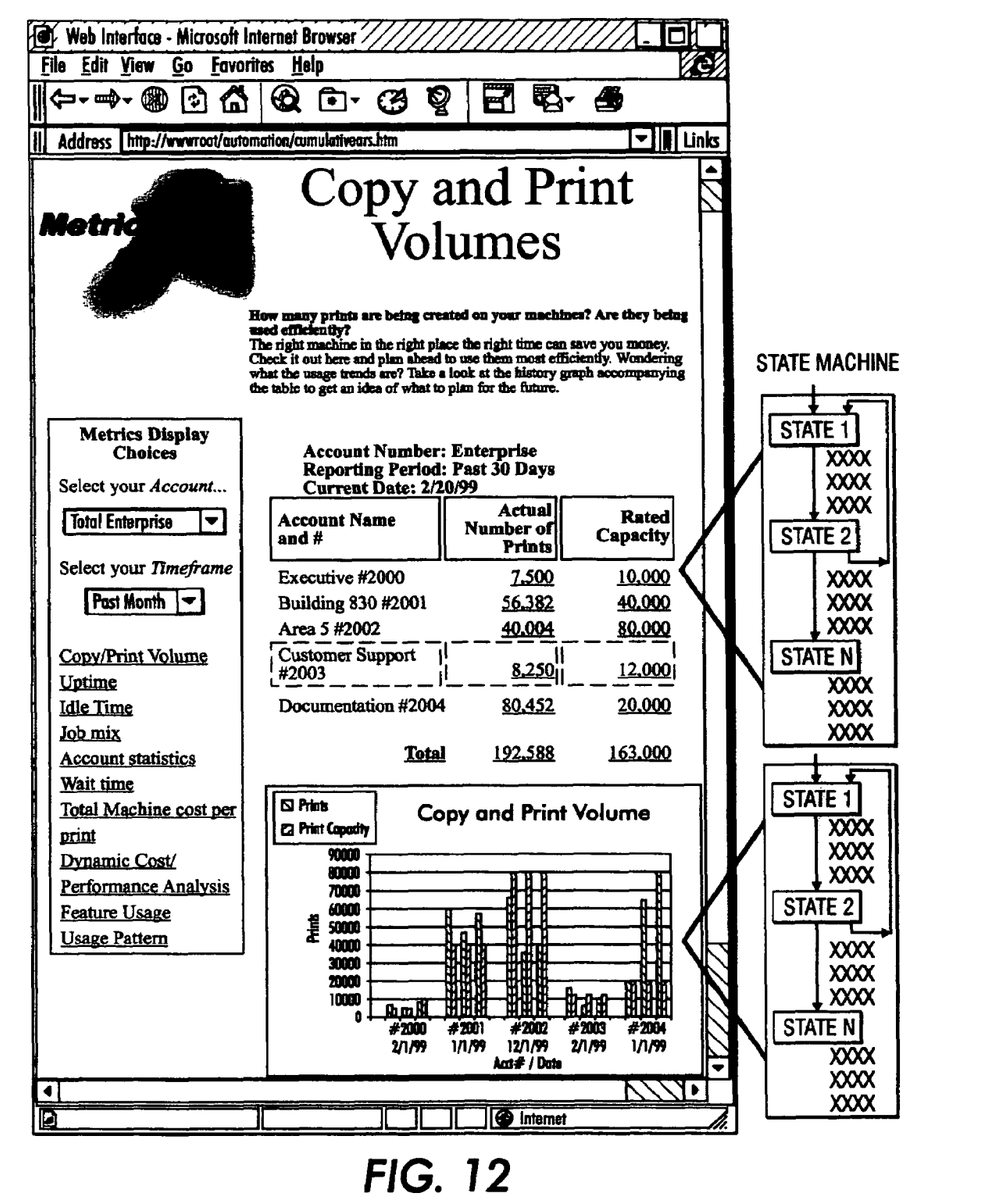
FIG. 12 shows a second exemplary embodiment of a Web-page presentation of a Web object with its backing state machine containing an embedded Web object and its supporting state machine.

FIG. 12 shows another exemplary Web-page presentation of a Web object with its backing state machine containing an embedded Web object and its supporting state machine.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for operating a Web-based management system of a plurality of networked devices, comprising:
   automatically collecting and analyzing networked device information from the networked devices;
   processing data related to the networked devices by at least one Web object;
   providing a runtime support to ensure that the data is atomically processed per event without being interrupted, wherein the runtime support includes an event queue that operates on a first-in-first-out basis; and
   independently assembling and displaying data related to the networked device information on a distributed network,
   wherein assembling and displaying the data related to the networked device information on a distributed network includes creating at least one Web page from at least one Web object, wherein the at least one Web object is a self-contained entity with object data, an associated presentation and a state machine lifecycle.

2. The method of claim 1, wherein analyzing the networked device information includes creating metrics data and the displayed data includes the metrics data.

3. The method of claim 1, wherein the networked device information includes internal and external data from the networked devices.

4. The method of claim 1, wherein at least one of graphical, textual, statistical, metrics and status data is generated and presented to a user on demand.

5. The method of claim 1, wherein collecting and analyzing networked device information from the networked devices is automated by using a network database.

6. The method of claim 1, wherein collecting and analyzing networked device information is executed concurrently from more than one of the networked devices.

7. The method of claim 1 wherein creating the at least one Web page uses networked device information as well as events and data from at least one other Web object.

8. The method of claim 1 further comprising generalizing the form of the at least one Web object as a template so that the at least one Web page is created separately.

9. The method of claim 1, further comprising creating at least one Web page with a web page authoring tool in combination with at least one Web object, wherein the at least one Web object is a self-contained entity with object data, an associated presentation and a state machine lifecycle.

10. A method for efficient Web-based presentation of data gathered from networked devices, comprising:
    automatically gathering data from at least one networked device using server Web-object state transitions, events and actions independently of user interaction;
    processing the data related to the at least one networked device by at least one Web object; and
    providing a runtime support to ensure that the web-object state transitions are atomic so that they cannot be interrupted,
    wherein the runtime support includes an event queue that operates on a first-in-first-out basis,
    wherein the at least one Web object is a self-contained entity with object data, an associated presentation and a state machine lifecycle.

11. The method of claim 10, wherein automatically gathering data is in real-time.

12. The method of claim 10, further comprising ensuring integrity of at least one persistent Web object to enable accurate updating of data embedded in at least one Web page.

13. The method of claim 10, further comprising manipulating a common persistent Web object using one or more front-end Web servers while maintaining integrity of data in the common Web object.

14. The method of claim 13, further comprising presenting simultaneous alternative views of the common Web-object.

15. The method of claim 14, further comprising allowing each of a plurality of users to access the common Web object in different ways without affecting the view of the other users.

16. The method of claim 10, further comprising dynamically altering the appearance of a persistent Web object.

17. The method of claim 16, further comprising separating the presentation of the persistent Web object from its content.

18. The method of claim 17, further comprising placing layout and appearance instructions for the Web object in at least one template.

19. The method of claim 10, further comprising dynamically altering the appearance of a Web object in response to dynamic events.

20. A data presentation system for a plurality of networked devices, comprising:
    at least one Web object to form a Web page, a Web object being a self-contained entity with object data, an associated presentation and a state machine lifecycle; and
    a runtime support to ensure that the web object processes events atomically so that the processing cannot be interrupted, wherein the runtime support includes an event queue that operates on a first-in-first-out basis.

21. A data presentation system for a plurality of networked devices, comprising:
    at least one Web object to create a Web page by processing data related to the networked devices that has been automatically collected and analyzed,
    a Web object being a self-contained entity with object data, an associated presentation and a state machine lifecycle; and
    a runtime support to ensure that the Web object processes events atomically so that the processing cannot be interrupted, wherein the runtime support includes an event queue that operates on a first-in-first-out basis, and wherein creating the Web page comprises independently assembling and displaying data related to the processed data on a distributed network.

22. The data presentation system of claim 20, wherein the Web-object further comprises at least one template.

23. The data presentation system of claim 22, further comprising a network database that stores networked device information from the networked devices, the network database providing the networked device information to at least one template.

24. The data presentation system of claim 20, further comprising a web page authoring tool that creates the Web page using at least one template.

* * * * *